(12) United States Patent
Jacob

(10) Patent No.: US 11,548,195 B2
(45) Date of Patent: Jan. 10, 2023

(54) ANGLE GATING INJECTION MOLDING APPARATUS

(71) Applicant: MOLD-MASTERS (2007) LIMITED, Georgetown (CA)

(72) Inventor: Kenneth Jacob, Tunkhannock, PA (US)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 0 days.

(21) Appl. No.: 17/506,982

(22) Filed: Oct. 21, 2021

(65) Prior Publication Data

US 2022/0126493 A1 Apr. 28, 2022

Related U.S. Application Data

(60) Provisional application No. 63/104,163, filed on Oct. 22, 2020.

(51) Int. Cl.
*B29C 45/27* (2006.01)
*B29C 45/20* (2006.01)

(52) U.S. Cl.
CPC ............ *B29C 45/278* (2013.01); *B29C 45/20* (2013.01); *B29C 45/2708* (2013.01); *B29C 2045/2783* (2013.01)

(58) Field of Classification Search
CPC ... B29C 45/278; B29C 45/20; B29C 45/2708; B29C 2045/2783; B29C 45/27; B29C 45/74; B29C 45/22; B29C 45/38
See application file for complete search history.

(56) References Cited

U.S. PATENT DOCUMENTS

| | | | |
|---|---|---|---|
| 5,711,910 A | 1/1998 | Kostrivas et al. | |
| 6,390,803 B1 | 5/2002 | Christen | |
| 8,282,387 B2 | 10/2012 | Braun | |
| 8,932,046 B2 | 1/2015 | Tabassi et al. | |
| 2003/0170340 A1* | 9/2003 | Sicilia | B29C 45/278 425/566 |
| 2004/0224046 A1* | 11/2004 | Babin | B29C 45/27 425/192 R |
| 2011/0033570 A1* | 2/2011 | Braun | B29C 45/2735 425/549 |
| 2013/0243899 A1* | 9/2013 | Babin | B29C 45/2735 425/549 |
| 2015/0375436 A1* | 12/2015 | Spuller | B29C 45/2735 425/549 |

FOREIGN PATENT DOCUMENTS

| | | |
|---|---|---|
| EP | 0186413 A2 | 7/1986 |
| EP | 0657269 A1 | 6/1995 |
| EP | 2199055 A1 | 6/2010 |
| EP | 3 172 024 B1 | 2/2019 |

* cited by examiner

*Primary Examiner* — Matthew J Daniels
*Assistant Examiner* — Shibin Liang
(74) *Attorney, Agent, or Firm* — Dinsmore & Shohl LLP

(57) ABSTRACT

An angle gating injection molding apparatus is disclosed. The apparatus includes a gate axis misaligned with a cone axis of a nozzle tip.

20 Claims, 10 Drawing Sheets

ANGLE GATING INJECTION MOLDING APPARATUS

RELATED APPLICATION

This application claims the benefit of prior Application No. 63/104,163, filed Oct. 22, 2020, which is incorporated by reference herein in its entirety.

TECHNICAL FIELD

The present invention relates to angle gating injection molding, and in particular, to a nozzle tip and a mold gate in an angle gating injection molding apparatus.

BACKGROUND

Molding material protruding from a gate area on a molded article after it has been removed from a mold is known as gate vestige. Gate vestige is undesirable as it requires close inspection to identify affected molded articles which are either disposed of or subjected to further processing to remove the protruding molding material from affected molded articles. Gate vestige can be particularly troublesome in angle gating injection molding applications where an axis of a mold gate is disposed at an angle between 25 degrees and 65 degrees, to a draw direction of an injection mold.

SUMMARY

An aspect of the present application provides an injection molding apparatus comprising: a gate component defining at least a portion of a mold cavity, the gate component having a draw axis and a recess extending into the gate component towards the draw axis, the recess including an alignment bore and terminating at a mold gate leading to the mold cavity, the mold gate having a gate axis intersecting the draw axis at an acute angle; a nozzle laterally offset to a side of the gate component, the nozzle having a melt channel for receiving a molding material from a source, the melt channel including lateral channel portion extending towards an outward facing sidewall of the nozzle and terminating at a nozzle outlet; a nozzle tip coupled to the nozzle at an acute angle to the draw axis, the nozzle tip received in the recess in the gate component, the nozzle tip including an inner tip component defining at least in part a tip channel in fluid communication with the nozzle outlet and the mold cavity and an outer tip component surrounding the inner tip component and having an outer alignment surface mating with the alignment bore of the recess, and the inner tip component having an upstream end abutting the nozzle, a downstream end, a conical portion having an apex at the downstream end, and the conical portion having a cone axis that is misaligned with the gate axis.

The apex of the conical portion can be spaced apart from the gate axis in a direction that is away from/opposite to the draw direction.

The cone axis and the gate axis can be parallel misaligned.
The cone axis and the gate axis can be angular misaligned.
The gate axis and the cone axis can be axially misaligned along a plane that extends through the cone axis and the draw axis.

The alignment bore, the circumferential outer surface of the outer tip component and the conical portion can be concentric.

The inner tip component can include a tip body that is coaxial with the conical portion.

The alignment bore, the circumferential outer surface of the outer tip component and the mold gate can be concentric.

The angular position of the outer tip component can be rotatably fixed relative to the inner tip component and the angular position of the outer tip component can be rotatably fixed relative to the alignment bore.

The inner tip component can include a tip body having a tip body axis that is angularly misaligned with the cone axis.

The inner tip component can include a tip body having a tip body axis that is parallel misaligned with the cone axis.

The angular position of the outer tip component can be fixed relative to the inner tip component by one of a keyed joint between the outer tip component and the inner tip component and the outer tip component can have a non-circular shaped socket mating with a complementary a non-circular shaped plug on a body portion of the inner tip component.

The angular position of the outer tip component can be fixed relative to the alignment bore by one of a keyed joint between the outer tip component and the gate component, and the outer tip component can have a non-circular shaped socket mating with a complementary a non-circular shaped socket in the gate component.

The gate axis can intersect the draw axis at an acute angle of between 30 degrees and 60 degrees.

The gate axis can intersect the draw axis at a 45-degree angle.

The nozzle tip can seat against an outward facing surface of the nozzle that is orthogonal to the gate axis.

The lateral channel portion can include a counterbore at its downstream end and the outward facing surface is defined by a step between the counterbore and the lateral channel portion.

At least a portion of the counter bore can include internal threads, a portion of the outer tip component includes external threads and the inner tip component can be secured to the nozzle by a threaded engagement between the outer tip component and the counterbore.

The outer tip component can include a skirt seated against a support surface of the gate component that is orthogonal to the gate axis, and in operation, the nozzle tip is sandwiched between the outward facing surface of the nozzle and the support surface of the mold cavity component.

The nozzle tip can seat against an outward facing surface of the nozzle that is parallel to the gate axis.

BRIEF DESCRIPTION OF DRAWINGS

The drawings may not be to scale.

DETAILED DESCRIPTION

In the following description, "downstream" is used with reference to the general direction of molding material flow from an injection unit to a mold cavity of an injection molding system and to the order of components, or features thereof, through which the molding material flows from an inlet of the injection molding system to the mold cavity. "Upstream" is used with reference to the opposite direction. Further, there is no intention to be bound by any expressed or implied theory presented in the preceding technical field, background, summary or the following detailed description.

Figure 1:
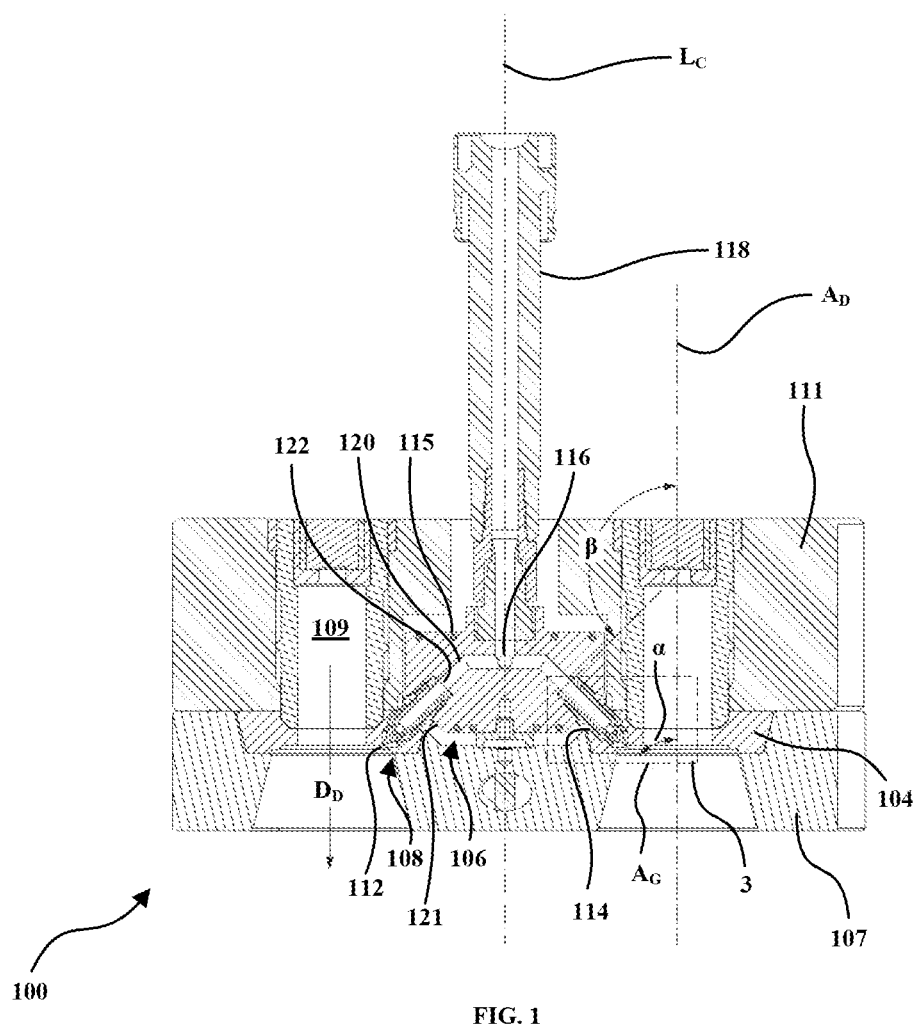
FIG. 1 is a sectional view of an angle gating injection molding apparatus in accordance with an embodiment of the present application.

FIG. 1 is a sectional view of an injection molding apparatus 100 in accordance with an embodiment of the present application. Features and aspects of the current embodiment can be used accordingly with the other embodiments. Injection molding apparatus 100 includes a gate component 104, a nozzle 106 offset to a side of gate component 104, and a nozzle tip 108, which together with nozzle 106 deliver a molding material to a mold cavity 109 which, in part, defines the shape of a molded article 110 (see FIG. 2) that is formed by injection molding apparatus 100. Nozzle 106 and mold gate component 104 are received within mold plates 107 and 111.

Gate component 104 defines a mold gate 112 and at least a portion of mold cavity 109. In operation, a molding material is injected through mold gate 112 to mold cavity 109. Gate component 104 includes a draw axis $A_D$ and a recess 114 in which nozzle tip 108 is received. Draw axis $A_D$ is parallel to a draw direction $D_D$ of injection molding apparatus 100 along which molded article 110 is withdrawn from mold cavity 109 by a mold core (not shown). Draw direction $D_D$ is parallel to an opening and closing movement of an injection molding machine (not shown) which, in operation, injection molding apparatus 100 is installed. Recess 114 extends into gate component 104 towards draw axis $A_D$ and terminates at mold gate 112 which has a gate axis $A_G$ that intersects draw axis $A_D$ at an acute angle α. In the illustrated embodiment of FIGS. 1,3, and 4, gate axis $A_G$ intersects draw axis $A_D$ at a 45-degree angle; however, gate axis $A_G$ can intersect draw axis $A_D$ at any angle between 25-degrees and 65 degrees.

Nozzle 106 includes a nozzle center line $L_C$ that is parallel to draw axis $A_D$. Nozzle 106 further includes a heater 115 for maintaining nozzle 106 at a suitable processing temperature and a nozzle channel 116 for receiving a molding material from a source, for example an upstream melt delivery component 118, which, as shown in the illustrated embodiment of FIG. 1, is axially aligned with nozzle centerline $L_C$. Nozzle channel 116 includes lateral channel portion 120 that extends towards an outer sidewall 121 of nozzle 106 and terminates at a nozzle outlet 122.

Figure 2:
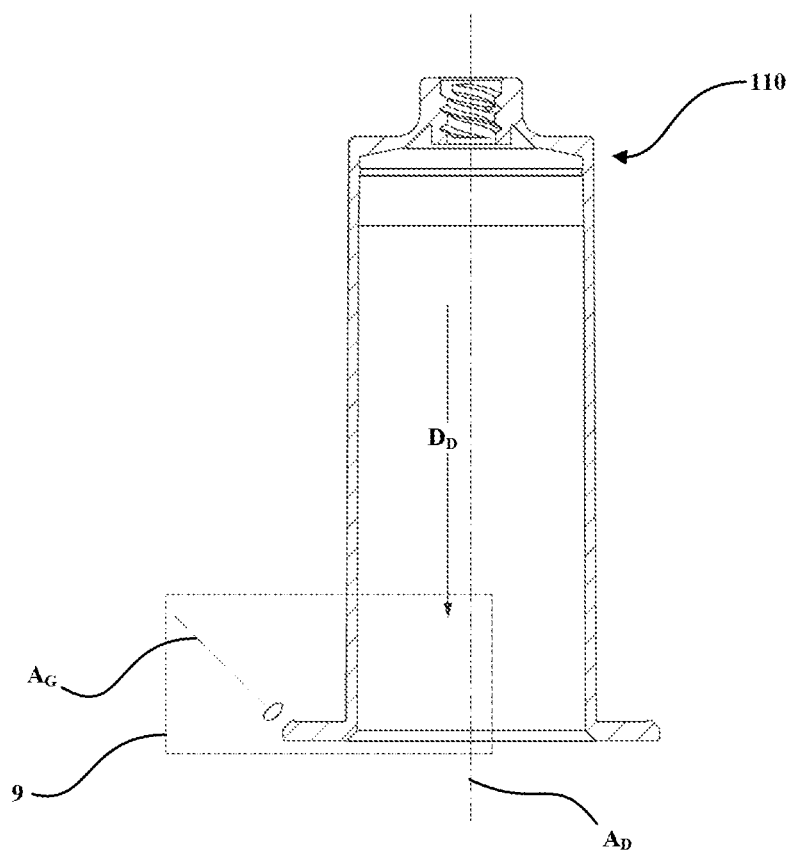
FIG. 2 is a sectional view of a molded article formed by the injection molding apparatus of FIG. 1.
Figure 3:
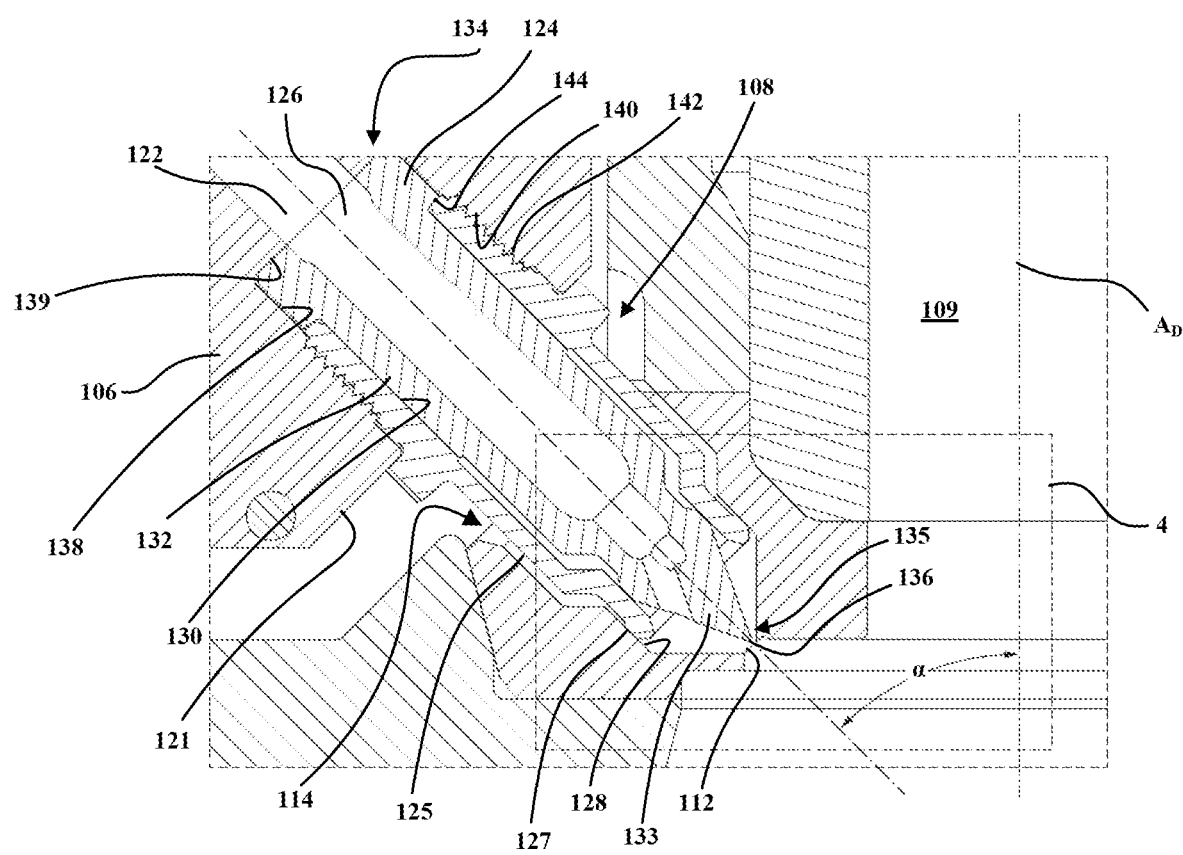
FIG. 3 is an enlarged view of a portion 3 of FIG. 1.

Referring to FIG. 3, which is an enlarged view of a portion 3 of FIG. 1. Nozzle tip 108 is coupled to nozzle 106 at an acute angle α to draw axis $A_D$. Nozzle tip 108 includes an inner tip component 124 and an outer tip component 125. Inner tip component 124 defines at least in part a tip channel 126 that is in fluid communication with nozzle outlet 122 and mold cavity 109. Outer tip component 125 surrounds inner tip component 124 and is generally sleeve shaped. Outer tip component 125 includes an outer alignment surface 127 that mates with an alignment bore portion 128 of recess 114. Downstream from alignment bore 128, recess 114 tapers inward towards mold gate 112. Outer tip component 125 further includes an inner alignment surface 130 that mates with a body portion 132 of inner tip component 124 to position inner tip component 124 relative to outer tip component 125. In the illustrated embodiment of FIGS. 1, 2, and 3, body portion 132 and a conical portion 133 of inner tip component 124 are concentric.

Figure 4:
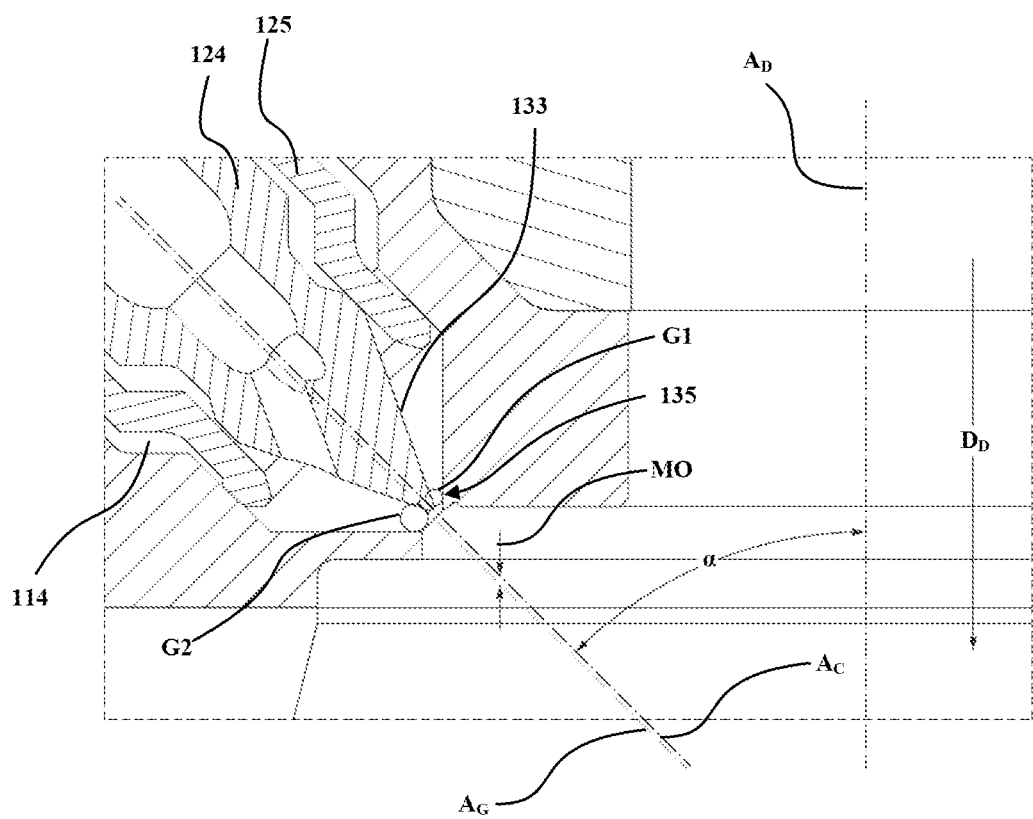
FIG. 4 an enlarged view of a portion 4 of FIG. 3.

Continuing with FIG. 3 and referring to FIG. 4, which is an enlarged view of a portion 4 of FIG. 3. Inner tip component 124 includes an upstream end 134 abutting nozzle 106, a downstream end 135 (see FIG. 4), conical portion 133 having an apex 136 at downstream end 135 and a cone axis $A_C$ (see FIG. 4) that is misaligned with gate axis $A_G$ (see FIG. 4).

In the illustrated embodiment of FIGS. 1, 3, and 4, cone axis $A_C$ and gate axis $A_G$ are parallel misaligned, and apex 136 is spaced apart from gate axis $A_G$, shown by misalignment offset MO, in a direction that is away from draw direction $D_D$.

In this configuration, a gap G1, between conical portion 133 and a side of recess taper which is longitudinally aligned with or generally longitudinally aligned with draw direction $D_D$ is smaller than a gap, shown at area G2, between conical portion 133 and an opposite side of recess taper which is transverse to or generally transverse to draw direction $D_D$. A smaller gap which is longitudinally aligned with or generally longitudinally aligned with draw direction $D_D$, can reduce or prevent gate vestige on molded articles.

Figure 5:
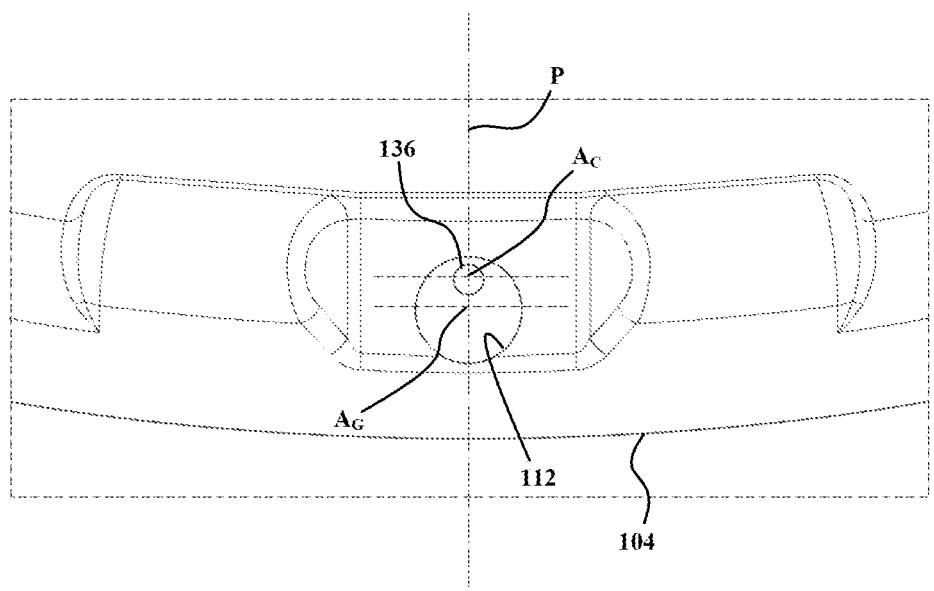
FIG. 5 is a face view of a nozzle tip and a gate component of an injection molding apparatus in accordance with another embodiment of the present application.

FIG. 5 is a face view, i.e. a view in a direction along gate axis $A_G$ of nozzle tip 108 and gate component 104 of an injection molding apparatus 100 in accordance with another embodiment of the present application. Mold gate 112 includes gate axis $A_G$ and nozzle tip 108 includes cone axis $A_C$ which are axially misaligned along a plane P that extends through both cone axis $A_C$ and draw axis $A_D$. In this configuration, misalignment between gate axis $A_G$ and cone axis $A_C$ is reflectionally symmetric across plane P.

In the illustrated embodiment of FIGS. 1, 3, 4, and 5, misalignment between cone axis $A_C$ and gate axis $A_G$ is realized by forming nozzle tip 108 so that conical portion 133 and outer alignment surface 127 are coaxial, and by forming gate component 104 so that alignment bore 128 and mold gate 112 are axially misaligned. In this configuration, when nozzle tip 108 is installed in recess 114, alignment bore 128 and outer alignment surface 127 are concentric about cone axis $A_C$ and cone axis $A_C$ is parallel misaligned with gate axis $A_G$ by the same amount that alignment bore 128 and mold gate 112 are parallel misaligned.

Returning to FIG. 3, in the illustrated embodiment of FIGS. 1, 2, and 4 nozzle tip 108 is rigidly coupled to nozzle 106 so as to limit or prevent longitudinal and lateral movement of nozzle tip 108 relative to nozzle 106. An example of rigidly coupled includes inner tip component 124 being received in a closely sized counterbore 138 in nozzle 106 that defines an outward facing step 139 between nozzle outlet 122 and outer sidewall 121. Counterbore 138 includes internal threads 140 that mate with complementary external threads 142 formed on outer tip component 125. Outer tip component 125 seats against a shoulder 144 on inner tip component 124, and inner tip component 124, and nozzle tip 108 are secured to nozzle 106 by tightening threads 140, 142 to hold upstream end 134 against step 139.

Figure 6:
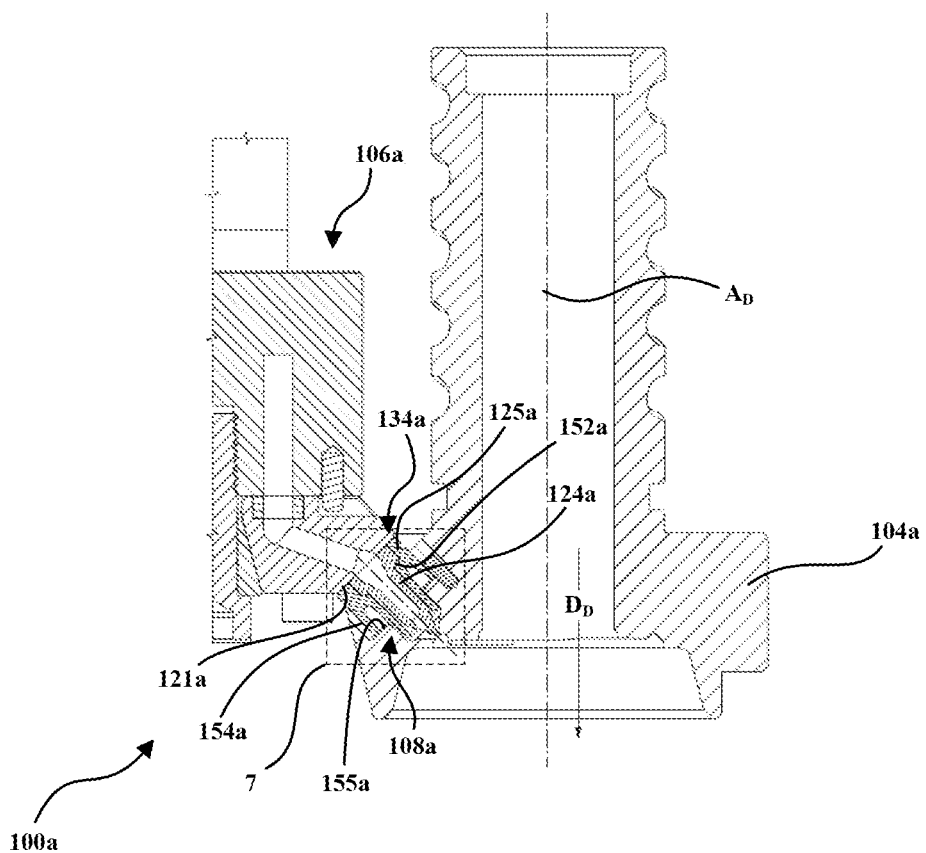
FIG. 6 is a sectional view of a portion of an angle gating injection molding apparatus having a nozzle tip and a gate component in accordance with another embodiment of the present application.
Figure 7:
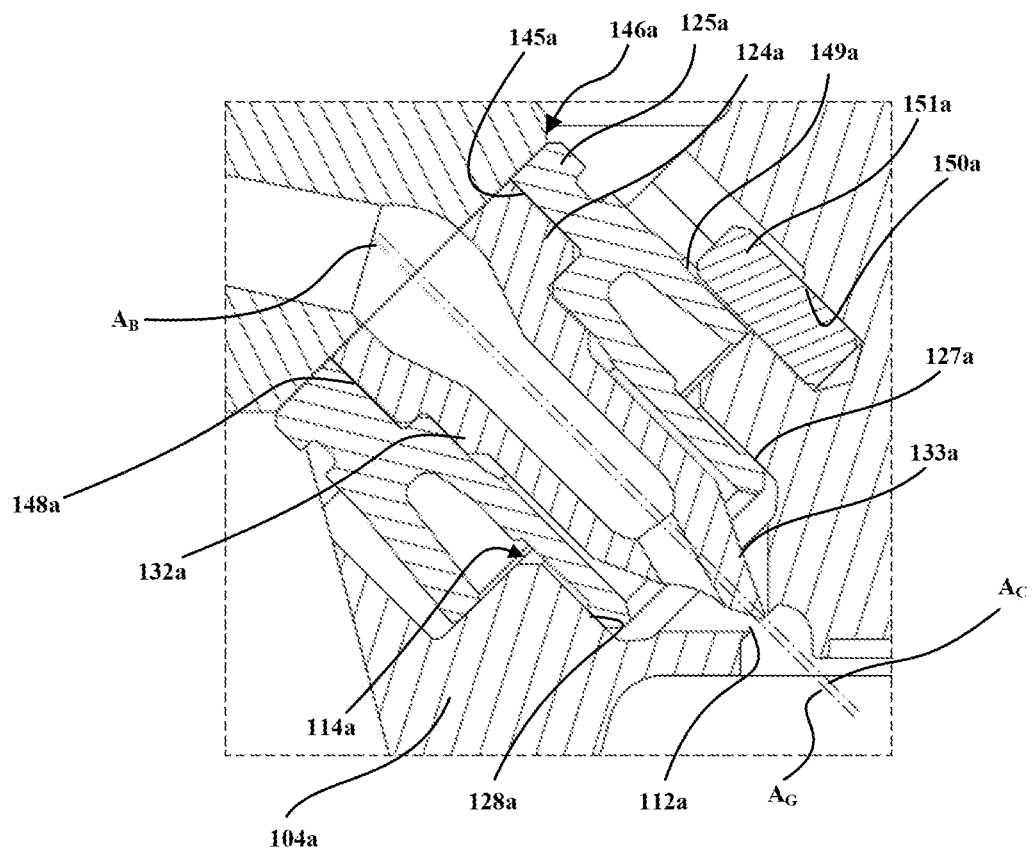
FIG. 7 is an enlarged view of a portion of FIG. 6 shown isolated from a nozzle.

Referring to FIGS. 6 and 7, in which FIG. 6 is a sectional view of a portion of an angle gating injection molding apparatus 100a having a nozzle 106a, a nozzle tip 108a and a gate component 104a in accordance with another embodiment of the present application, and FIG. 7 is an enlarged view of a portion 7 of FIG. 6 shown isolated from nozzle 106a. Features and aspects of the current embodiment can be used accordingly with the other embodiments.

Figure 8:
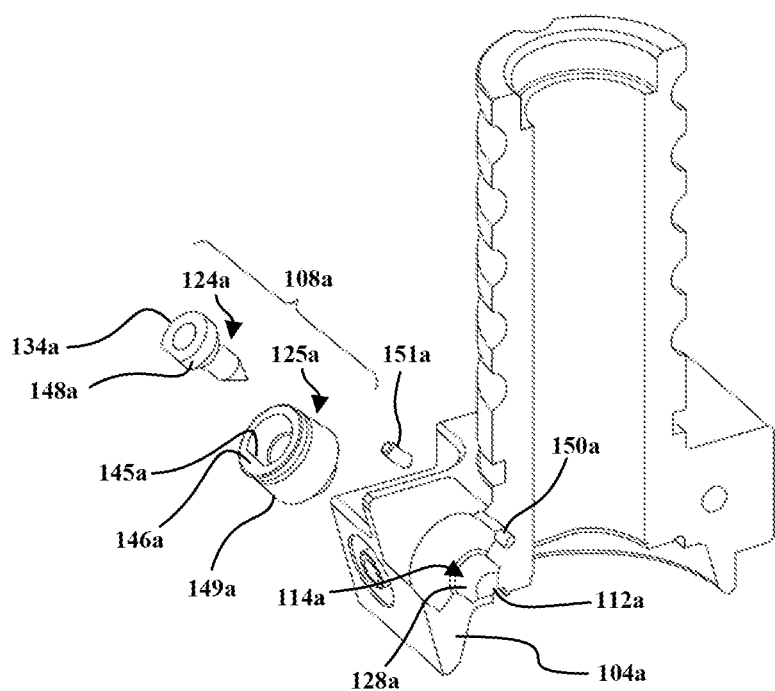
FIG. 8 is a partially sectioned and exploded view of the gate component and the nozzle tip of FIGS. 6 and 7.

The illustrated embodiment of FIGS. 6 to 8 differs from the illustrated embodiment of FIGS. 1, 3, and 4 in that, axial misalignment between cone axis $A_C$ and gate axis $A_G$ is realized by an axially misaligned nozzle tip 108a, and nozzle tip 108a being slidably coupled to nozzle 106a.

Referring to FIG. 7, gate component 104a includes an alignment bore 128a and a mold gate 112a that are coaxial, i.e. about gate axis $A_G$, and nozzle tip 108a has a conical portion 133a that is axially misaligned with outer alignment surface 127a. In this configuration, when nozzle tip 108a is installed in recess 114a, alignment bore 128a and outer alignment surface 127a are concentric about gate axis $A_G$, whereas cone axis $A_C$ is misaligned with gate axis $A_G$. Misalignment between cone axis $A_C$ and outer alignment surface 127a can be facilitated by forming inner tip component 124a to a have a body portion 132a that is concentric to outer alignment surface 127a, coaxial with gate axis $A_G$, and misaligned with cone axis $A_C$. In this configuration, when nozzle tip 108a is installed in recess 104a, alignment bore 128a and outer alignment surface 127a are concentric about gate axis $A_G$, and cone axis $A_C$ is misaligned with gate axis $A_G$. In the illustrated embodiment of FIGS. 6 and 7, misalignment between tip body 132a and cone axis $A_C$ is parallel misalignment; however, misalignment between tip body axis $A_B$ and cone axis $A_C$ can also be an angular misalignment, or a combination of parallel and angular misalignment. Parallel and angular axial misalignment are illustrated schematically in FIGS. 9 and 10.

Misaligned nozzle tip 108a can be used with misaligned gate component 104 described with regard to FIGS. 1, 3, and 4, which will allow for misalignments between gate axis $A_G$ and cone axis $A_C$ other than the misalignment between mold gate 112 and alignment bore 128.

Continuing with FIG. 7 and referring to FIG. 8 which is sectioned view of gate component 104a and an exploded view of nozzle tip 108a, to promote a desired misalignment between cone axis $A_C$ and gate axis $A_G$ when nozzle tip 108a is installed in recess 114a, the angular position of inner tip component 124a is rotatably fixed relative to outer tip component 125a and the angular position of outer tip component 125a is rotatably fixed relative to alignment bore 128a. In the illustrated embodiment of FIGS. 6-8, the angular position of inner tip component 124a relative to outer tip component 125a is fixed by way of a non-circular shaped socket 145a at an upstream end 146a of outer tip component 125a in which a corresponding a non-circular shaped plug 148a at upstream end 134a of inner tip component 124a is received.

In the illustrated embodiment of FIGS. 6-8, the angular position of outer tip component 125a is rotatably fixed relative to alignment bore 128a by a keyed joint between outer tip component 125a and gate component 104a. In particular, outer tip component 125a includes a first key-slot 149a and gate component 104a includes a second key-slot 150a which is axially aligned with first key-slot 149a at a predetermined angular location about gate axis $A_G$ that will achieve the desired misalignment between cone axis $A_C$ and gate access $A_G$ when a key 151a is installed to extend between first and second key slots 149a, 150a. It should be appreciated that fixing the angular position of inner tip component 124a to outer tip component 125a and fixing the angular position of outer tip component 125a to gate component 104a can be achieved by different combinations of a keyed joint and mating non-circular plug and socket combinations other than what is described above.

Returning to FIG. 6, nozzle tip 108a, is slidably coupled to nozzle 106a so as to permit relative movement between nozzle tip 108a and nozzle 106a without exposing nozzle tip 108a to undue side loading, for example to accommodate thermal expansion of nozzle 106a. In an example of slidably coupled, upstream end 134a of inner tip component 124a abuts outward facing sidewall 121a and includes a shoulder 152a against which outer tip component 125a is seated. In the illustrated embodiment of FIGS. 6-8, outer tip component 125a includes a skirt 154a that seats against a support surface 155a on gate component 104a that is orthogonal to gate axis $A_G$. In operation, outward thermal expansion of nozzle 106a compresses nozzle tip 108a between outward facing surface 121a and support surface 155a to promote a fluid seal between nozzle 106a and nozzle tip 108a.

Figure 9:
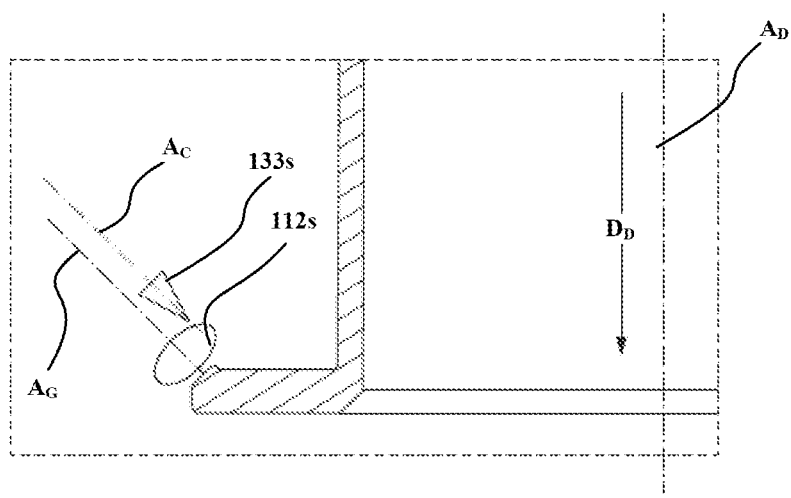
FIG. 9 is an enlarged view of a portion of FIG. 2, depicting parallel misalignment.

FIG. 9 is an enlarged view of a portion 9 of FIG. 2, depicting parallel misalignment of cone axis $A_C$ and gate axis $A_G$. Mold gate 112s and conical portion 133s are shown schematically in FIG. 9.

Figure 10:
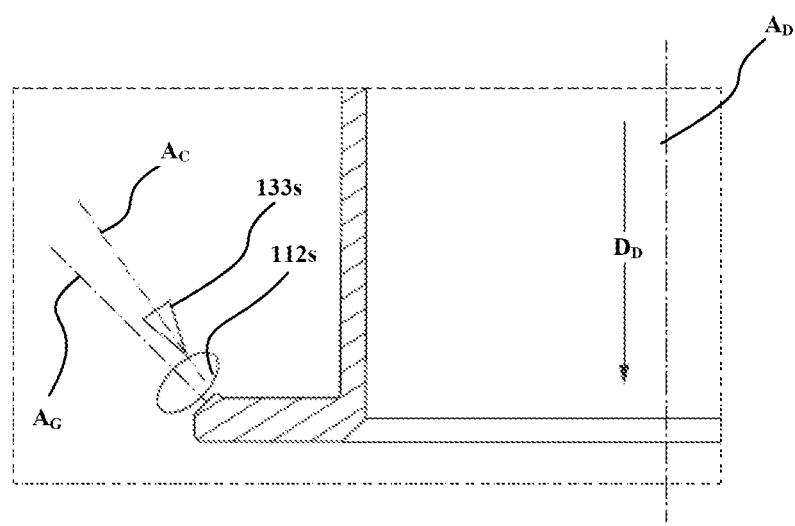
FIG. 10 is the enlarged view of a portion of FIG. 2, depicting angular misalignment.

FIG. 10 is an enlarged view of a portion 9 of FIG. 2, depicting angular misalignment of cone axis $A_C$ and gate axis $A_G$. Mold gate 112s and conical portion 133s are shown schematically in FIG. 10.

While various embodiments have been described above, they are presented only as illustrations and examples, and not by way of limitation. Thus, the present application should not be limited by any of the above-described embodiments but should be defined only in accordance with the appended claims and their equivalents.

What is claimed is:

1. An injection molding apparatus comprising:
   a gate component defining at least a portion of a mold cavity, the gate component having a draw axis and a recess extending into the gate component towards the draw axis, the recess including an alignment bore and terminating at a mold gate leading to the mold cavity, the mold gate having a gate axis intersecting the draw axis at an acute angle;
   a nozzle laterally offset to a side of the gate component, the nozzle having a melt channel for receiving a molding material from a source, the melt channel including lateral channel portion extending towards an outward facing sidewall of the nozzle and terminating at a nozzle outlet; and
   a nozzle tip coupled to the nozzle at an acute angle to the draw axis, the nozzle tip received in the recess in the gate component, the nozzle tip including
      an inner tip component defining at least in part a tip channel in fluid communication with the nozzle outlet and the mold cavity and an outer tip component surrounding the inner tip component and having an outer alignment surface mating with the alignment bore of the recess, and the inner tip component having an upstream end abutting the nozzle, a downstream end, a conical portion having an apex at the downstream end, and the conical portion having a cone axis that is misaligned with the gate axis.

2. The injection molding apparatus of claim 1, wherein the apex of the conical portion is spaced apart from the gate axis in a direction that is away from/opposite to the draw direction.

3. The injection molding apparatus of claim 2, wherein the cone axis and the gate axis are parallel misaligned.

4. The injection molding apparatus of claim 2, wherein the cone axis and the gate axis are angular misaligned.

5. The injection molding apparatus of claim 1, wherein the gate axis and the cone axis are axially misaligned along a plane that extends through the cone axis and the draw axis.

6. The injection molding apparatus of claim 1, wherein the alignment bore, the circumferential outer surface of the outer tip component and the conical portion are concentric.

7. The injection molding apparatus of claim 6, wherein the inner tip component includes a tip body that is coaxial with the conical portion.

8. The injection molding apparatus of claim 1, wherein the alignment bore, the circumferential outer surface of the outer tip component and the mold gate are concentric.

9. The injection molding apparatus of claim 8, wherein the inner tip component includes a tip body having a tip body axis that is angularly misaligned with the cone axis.

10. The injection molding apparatus of claim 8, wherein the inner tip component includes a tip body having a tip body axis that is parallel misaligned with the cone axis.

11. The injection molding apparatus of claim 8, wherein the angular position of the outer tip component is rotatably fixed relative to the inner tip component and the angular position of the outer tip component is rotatably fixed relative to the alignment bore.

12. The injection molding apparatus of claim 11, wherein the angular position of the outer tip component is fixed relative to the inner tip component by one of a keyed joint between the outer tip component and the inner tip component and the outer tip component having a non-circular shaped socket mating with a complementary a non-circular shaped plug on a body portion of the inner tip component.

13. The injection molding apparatus of claim 11, wherein the angular position of the outer tip component is fixed relative to the alignment bore by one of a keyed joint between the outer tip component and the gate component, and the outer tip component having a non-circular shaped socket mating with a complementary a non-circular shaped socket in the gate component.

14. The injection molding apparatus of claim 1, wherein the gate axis intersects the draw axis at an acute angle of between 30 degrees and 60 degrees.

15. The injection molding apparatus of claim 14, wherein the gate axis intersects the draw axis at a 45-degree angle.

16. The injection molding apparatus of claim 1, wherein the nozzle tip seats against an outward facing surface of the nozzle that is orthogonal to the gate axis.

17. The injection molding apparatus of claim 16, wherein the lateral channel portion includes a counterbore at its downstream end and the outward facing surface is defined by a step between the counterbore and the lateral channel portion.

18. The injection molding apparatus of claim 17, wherein at least a portion of the counter bore includes internal threads, a portion of the outer tip component includes external threads and the inner tip component is secured to the nozzle by a threaded engagement between the outer tip component and the counterbore.

19. The injection molding apparatus of claim 16, wherein the outer tip component includes a skirt seated against a support surface of the gate component that is orthogonal to the gate axis, and in operation, the nozzle tip is sandwiched between the outward facing surface of the nozzle and the support surface of the mold cavity component.

20. The injection molding apparatus of claim 1, wherein the nozzle tip seats against an outward facing surface of the nozzle that is parallel to the gate axis.

* * * * *